United States Patent
Kim

(10) Patent No.: US 7,787,075 B2
(45) Date of Patent: Aug. 31, 2010

(54) LIQUID CRYSTAL DISPLAY

(75) Inventor: Kee Yong Kim, Incheon-si (KR)

(73) Assignee: Daewoo Electronics Corporation, Seoul (KR)

( * ) Notice: Subject to any disclaimer, the term of this patent is extended or adjusted under 35 U.S.C. 154(b) by 586 days.

(21) Appl. No.: 11/762,992

(22) Filed: Jun. 14, 2007

(65) Prior Publication Data

US 2008/0002114 A1    Jan. 3, 2008

(30) Foreign Application Priority Data

Jun. 15, 2006   (KR) .................... 10-2006-0053997
Jun. 15, 2006   (KR) .................... 10-2006-0053999

(51) Int. Cl.
*G02F 1/1335* (2006.01)

(52) U.S. Cl. .................... 349/64; 349/96; 349/113

(58) Field of Classification Search .................... None
See application file for complete search history.

(56) References Cited

U.S. PATENT DOCUMENTS 5,931,555 A * 8/1999 Akahane et al. ............. 362/613
7,623,197 B2 * 11/2009 Klenke ........................ 349/61
2008/0285308 A1 * 11/2008 Clary et al. .................. 362/619

* cited by examiner

*Primary Examiner*—Michelle R Connelly Cushwa
(74) *Attorney, Agent, or Firm*—Occhiuti Rohlicek & Tsao LLP

(57) ABSTRACT

Disclosed herein is a liquid crystal display that compensates an hourglass phenomenon using a backlight unit. The liquid crystal display includes a liquid crystal panel, a polarizer adhered to the liquid crystal panel, and a backlight unit including a diffuser sheet. A predetermined region of the diffuser sheet facing a region of the polarizer, where an hourglass phenomenon occurs, is formed to permit a smaller quantity of light to be transmitted therethrough than other regions of the diffuser sheet. With this construction, the liquid crystal display can avoid the hourglass phenomenon from being observed by a viewer, and prevent non-uniform brightness while improving image quality.

7 Claims, 7 Drawing Sheets

LIQUID CRYSTAL DISPLAY

BACKGROUND OF THE INVENTION

1. Field of the Invention

The present invention relates to a liquid crystal display, and more particularly to a liquid crystal display that compensates an hourglass phenomenon using a backlight unit.

2. Description of the Related Art

Among various kinds of thin displays having been developed and marketed, liquid crystal displays (LCDs) are widely used in the market due to their various advantages. LCD is a display device that includes two substrates, each having an electric field generating electrode formed on one side of the substrate, and a liquid crystal material injected into a gap defined between the substrates disposed to make the electrode-mounting sides face each other so that liquid crystal molecules can be arranged by electric field generated through application of voltage to the opposite electrodes to display images through adjustment of variable light transmittance.

Unlike other types of thin displays such as plasma display panels (PDPs), field emission displays (FEDs), etc., LCD is a non-emissive device, so it cannot be used without illumination. To solve this problem of LCD, a backlight unit is included therein as a surface light source of high brightness for the purpose of enabling operation of LCD in dark places.

In general, liquid crystal molecules have anisotropy and properties that the anisotropy of a liquid crystal cell or a film comprised of the liquid crystal molecules varies based on distribution of the liquid crystal molecules and distribution of tilt angles with respect to a substrate. Such properties of the liquid crystal molecules are major factors that change polarization of light depending on an angle of viewing the cell or the film comprised of the liquid crystals.

Recently, with an increasing demand of LCDs having high image quality and large size, a TN mode LCD adopts a wide view (WV) polarizer to solve its drawback of a narrow viewing angle.

FIG. 1 schematically shows the construction of the WV polarizer applied to conventional LCDs. Referring to FIG. 1, the WV polarizer 10 includes a polyvinyl alcoholic (PVA) film 11, which is a polarization film to control intensity of a transmitted beam based on a polarization degree of an incident beam, a tri-acetyl cellulose (TAC) film 12 and a T-SWV film 13 respectively adhered to both sides of the PVA film 11 to protect and support the PVA film 11, a compensation film 14 adhered to one side of the T-SWV film 13 for optical compensation of a liquid crystal cell, an adhesive 15 applied to an outer surface of the compensation film 14 to bond to a glass of the liquid crystal cell, and upper and lower protective films 17 respectively adhered to the adhesive 15 and the TAC film 12 to protect the WV polarizer.

As shown in FIG. 1, the WV polarizer 10 has a multi-layer structure of the films, which have different expansion and contraction coefficients for heat and humidity. So, when WV polarizer 10 is exposed to external heat and humidity for a long time period, some portions of the WV polarizer 10 become weakened. Detailed description of this will be described hereinafter.

In FIG. 1, the respective films are adhered on top of one another on the substrate by applying stress to the films in opposite diagonal directions. Specifically, if one film is adhered by applying stress in a diagonal direction, the next film is stacked on the adhered film by applying stress in an opposite diagonal direction. As a result, the respective films are stacked on top of one another by alternately applying stress in an "X"-shaped manner. In this manner, the WV polarizer 10 has the plural films bonded on top of one another by applying stress in the opposite diagonal directions. Here, since the films are vulnerable to heat and humidity, the films undergo stress caused by difference in expansion and contraction therebetween when exposed to the external heat and humidity for a long time period, so that weakened regions are formed near upper, lower, right and left edges of the polarizer 10. As a result, the WV polarizer suffers from light leakage when light is transmitted through these weakened regions exceeding a predetermined light transmission condition, which is referred to as an hourglass phenomenon.

FIG. 2 is a graph depicting brightness according to locations on a liquid crystal panel 50 in a normal operation, and FIG. 3 shows the liquid crystal panel 50 in the normal operation. As can be seen from these drawings, the overall region of the liquid crystal panel 50 exhibits substantially the same brightness in the normal operation. Namely, assuming the brightness at the center of the liquid crystal panel 50 is 100, the brightness at edges thereof is also 100.

FIG. 4 is a graph depicting brightness according to locations on the liquid crystal panel 50 upon occurrence of the hourglass phenomenon, and FIG. 5 shows the liquid crystal panel 50 upon occurrence of the hourglass phenomenon.

As described above, the weakened regions are mainly formed near upper, lower, right and left edges of the WV polarizer 10, and especially, the weakened regions are more easily formed near the right and left edges than near the upper and lower edges of the WV polarizer. Since the weakened regions allow a great quantity of light exceeding a predetermined condition to be transmitted therethrough, the hourglass phenomenon occurs at regions of a display screen corresponding to the weakened regions. Although the hourglass phenomenon is not clearly exhibited in an input of a white screen pattern, it becomes clear in an input of a dark screen pattern. Based on repetitious tests of an applicant of this invention, the WV polarizer had an approximately 20~40% higher light transmittance at the weakened regions near the edges of the polarizer compared with the center of the WV polarizer. That is to say, assuming the brightness at the center of the liquid crystal panel 50 is 100, the brightness at the edges thereof is about 120~140.

On the other hand, variation in physical properties of the WV polarizer caused by heat and humidity is attributed to inherent properties of the polarizer and is difficult to overcome only by improvement of a cell production process.

SUMMARY OF THE INVENTION

The present invention has been made to solve the above problems, and an aspect of the present invention is to provide a liquid crystal display that compensates an hourglass phenomenon by adjusting a quantity of light transmitted through a diffuser sheet.

In accordance with one aspect of the present invention, there is provided a liquid crystal display, comprising a liquid crystal panel, a polarizer adhered to the liquid crystal panel, and a backlight unit including a diffuser sheet, wherein a predetermined region of the diffuser sheet facing a region of the polarizer, where an hourglass phenomenon occurs, is formed to permit a smaller quantity of light to be transmitted therethrough than other regions of the diffuser sheet.

Preferably, the predetermined region of the diffuser sheet comprises a first region present in the range of 75~100% in either lateral direction from a vertical center on the diffuser sheet and a second region present in the range of 50~100% in either transverse direction from a horizontal center thereon, and excludes an overlapping region between the first region and the second region.

In accordance with another aspect of the present invention, there is provided a liquid crystal display, comprising a liquid crystal panel, a polarizer adhered to the liquid crystal panel, and a backlight unit including a diffuser sheet, wherein a predetermined region of the diffuser sheet facing a region of the polarizer, where an hourglass phenomenon occurs, is formed to have a lower light transmittance than other regions of the diffuser sheet.

Preferably, the predetermined region of the diffuser sheet has an approximately 10~20% lower light transmittance compared with the other regions of the diffuser sheet.

Preferably, the predetermined region of the diffuser sheet comprises a first region present in the range of 75~100% in either lateral direction from a vertical center on the diffuser sheet and a second region present in the range of 50~100% in either transverse direction from a horizontal center thereon, and excludes an overlapping region between the first region and the second region.

In accordance with yet another aspect of the present invention, in a liquid crystal display comprising a liquid crystal panel, a polarizer adhered to the liquid crystal panel, and a backlight unit located at rear of the liquid crystal panel, to which the polarizer is adhered, the backlight unit employing an LED lamp comprised of a plurality of LEDs, the improvement comprises: a temperature sensor disposed on a surface of the polarizer to detect an hourglass phenomenon; and a lamp driving controller connected to the temperature sensor to make signal exchange with the temperature sensor and to control brightness of a predetermined region of the LED lamp in response to an hourglass phenomenon detection signal from the temperature sensor.

Preferably, the lamp driving controller controls the brightness of the predetermined region of the LED lamp to be reduced by about 15~20% when receiving the hourglass phenomenon detection signal than when not receiving the hourglass phenomenon detection signal.

Preferably, the temperature sensor is disposed on the surface of a region of the polarizer where the hourglass phenomenon occurs.

Preferably, the predetermined region of the LED lamp having the brightness controlled by the lamp driving controller faces the region of the polarizer where the hourglass phenomenon occurs.

Preferably, the predetermined region of the LED lamp having the brightness controlled by the lamp driving controller comprises a first LED region present in the range of 75~100% in either lateral direction from a vertical central line on the LED lamp and a second LED region present in the range of 50~100% in either transverse direction from a horizontal central line thereon, and excludes an overlapping region between the first LED region and the second LED region.

BRIEF DESCRIPTION OF THE DRAWINGS

These and other objects and features of the present invention will be more clearly understood from the following detailed description taken in conjunction with the accompanying drawings, in which.

DETAILED DESCRIPTION OF THE EMBODIMENTS

Exemplary embodiments of the present invention will be described in detail with reference to the accompanying drawings. The drawings are not to precise scale and may be exaggerated in thickness of lines or size of components for the purpose of descriptive convenience and clarity only. Furthermore, terms used herein are defined in consideration of functions of components of the present invention and can be changed according to the custom or intention of users or operators. Therefore, definition of such terms should be determined according to overall disclosures set forth herein.

According to the present invention, a liquid crystal display allows a smaller quantity of light to be transmitted through a predetermined region than through other regions by controlling the quantity of light in the predetermined region in order to prevent a great quantity of light from passing through the predetermined region due to an hourglass phenomenon. To this end, the liquid crystal display includes a diffuser sheet whose light transmittance can be controlled, as a first embodiment of the invention described below, or an LED lamp whose brightness can be controlled, as a second embodiment of the invention described below, in a backlight unit to embody controlling the quantity of light in the predetermined region.

First, the liquid crystal display according to the first embodiment of the invention will be described hereinafter.

The liquid crystal display of this embodiment comprises a liquid crystal panel, a polarizer adhered to either side of the liquid crystal panel, and a backlight unit disposed at rear of the liquid crystal panel to which the polarizer is adhered. With an increase in brightness and size of the liquid crystal display, the hourglass phenomenon occurs due to the inherent features of the polarizer as described above, and makes upper, lower, right and left edges of a display screen brighter than other regions of the screen.

The backlight unit comprises a light source lamp such as an LED lamp, a light guide plate, a reflector sheet, a diffuser sheet, and a prism sheet.

Figure 6:
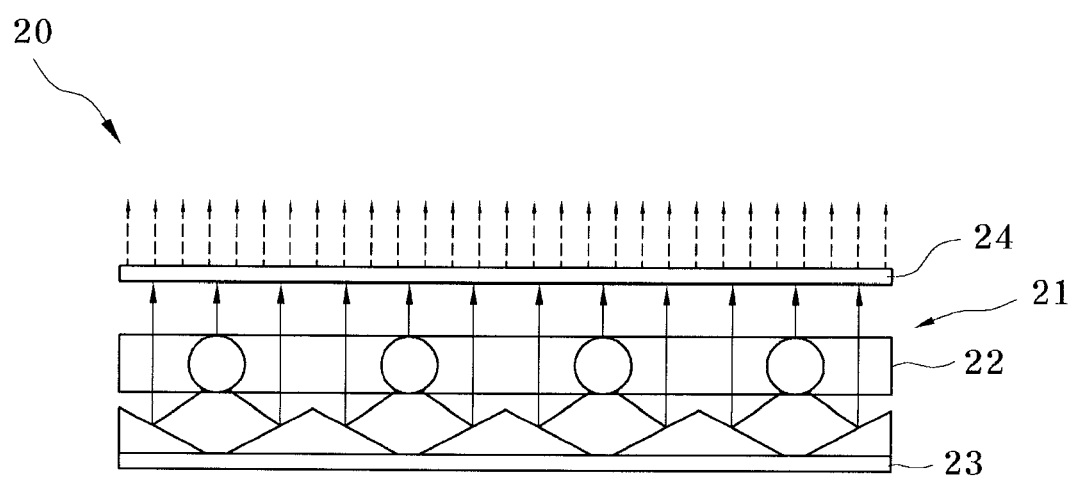
FIGS. 6 and 7 are constructional views of a backlight unit applied to LCD according to a first embodiment of the present invention.
Figure 7:
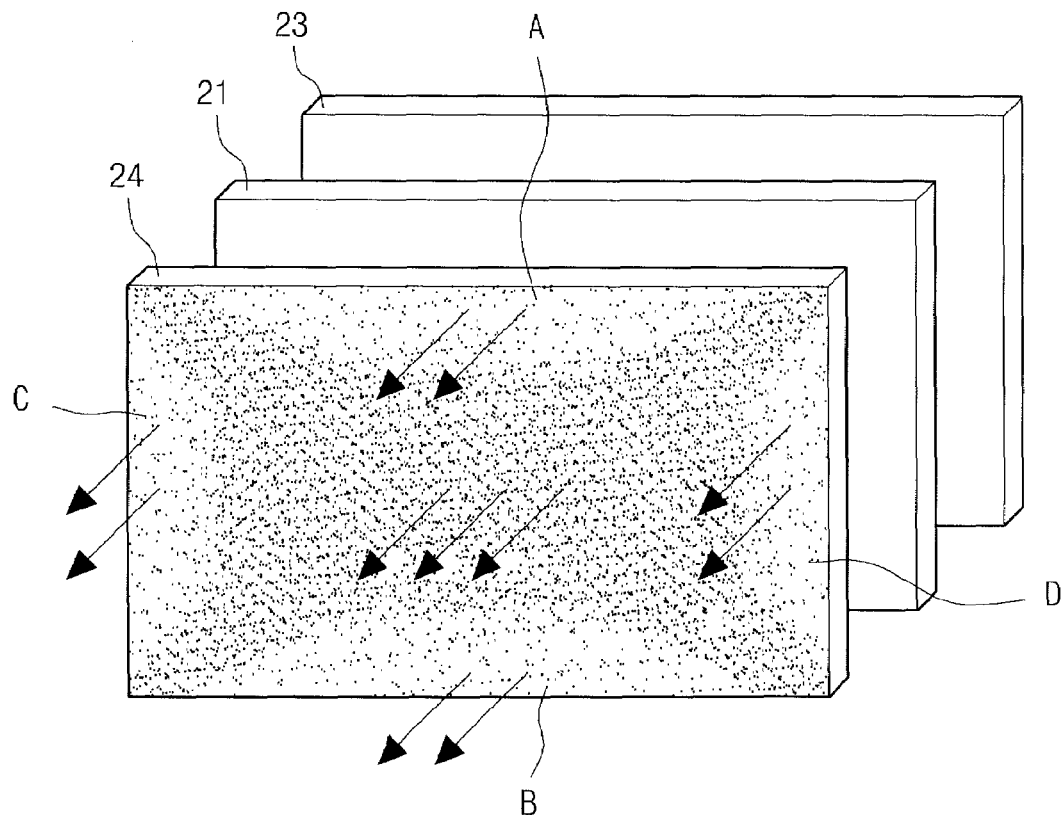

FIGS. 6 and 7 are constructional views of the backlight unit which can be applied to LCD according to the first embodiment of the invention.

Referring to FIGS. 6 and 7, the backlight unit 20 applied to LCD according to the first embodiment of the invention comprises an LED lamp 21, a light guide plate 22, a reflector sheet 23, a diffuser sheet 24, and a prism sheet (not shown).

The light guide plate 22 is a component to convert incident light from the LED lamp 21 into a uniform sheet beam, and is formed of polymethylmethacrylate (PMMA) which is an acrylic resin. The reason for adopting polymethylmethacrylate is as follows. That is, polymethylmethacrylate exhibits the lowest light absorption in the region of visible light among polymers, and provides good transparency and gloss.

The reflector sheet 23 is located below the light guide plate 22 and serves to enhance efficiency in use of light by reflecting incident light from the LED lamp 21 to a light emitting plane of the backlight unit 20, that is, towards the liquid crystal panel. Further, the reflector sheet 23 makes the entire light emitting plane of the backlight unit 20 uniform in brightness distribution by adjusting a reflected amount of the overall incident light to adjust an overall reflecting amount by the backlight unit 20.

Figure 3:
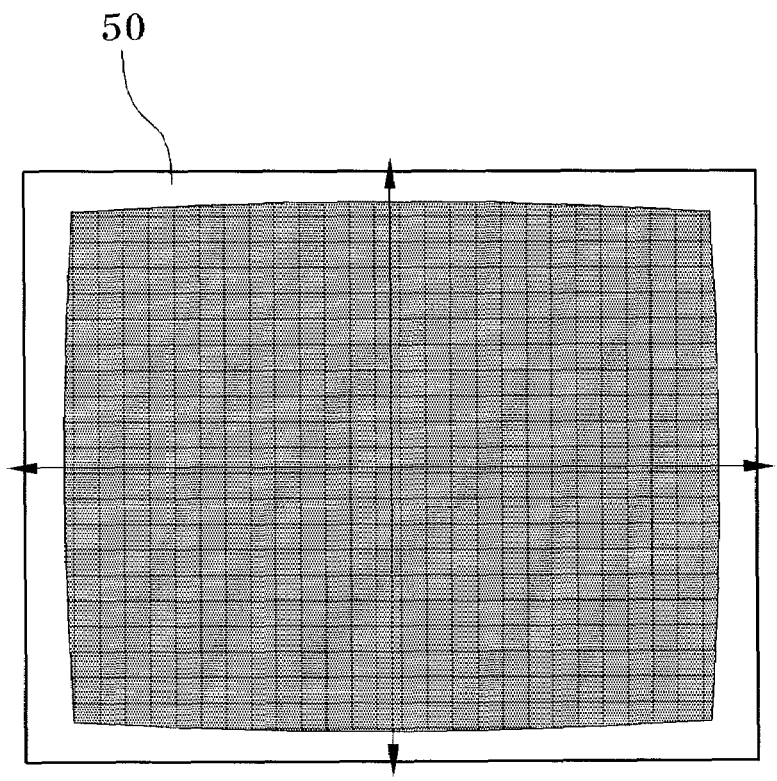

The diffuser sheet 24 is located near the liquid crystal panel 50 (see FIG. 3) above the light guide plate 22, and serves to increase and uniformize the brightness in a forward direction of the light emitting plane of the backlight unit 20 by diffusing and scattering light that enters the diffuser sheet 24 through the light guide plate 22.

The prism sheet is located above the diffuser sheet 24. The prism sheet enhances directionality of light and narrows a viewing angle by blocking light emitted from the diffuser sheet 24 from traveling in other directions instead of the forward direction of the light emitting plane, thereby improving the brightness in the forward direction of the light emitting plane of the backlight unit 20.

Figure 1:
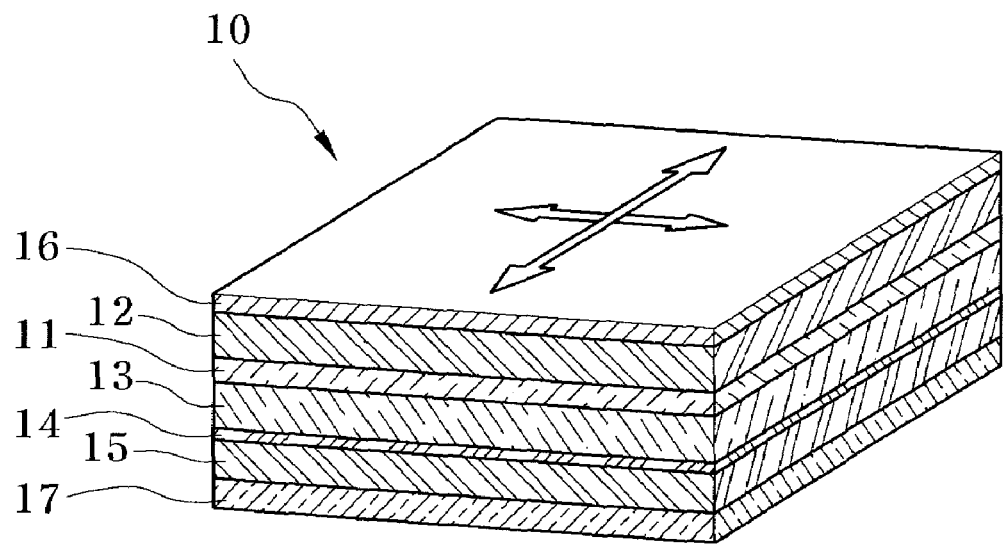
FIG. 1 is a constructional view of a WV polarizer for a conventional LCD.
Figure 2:
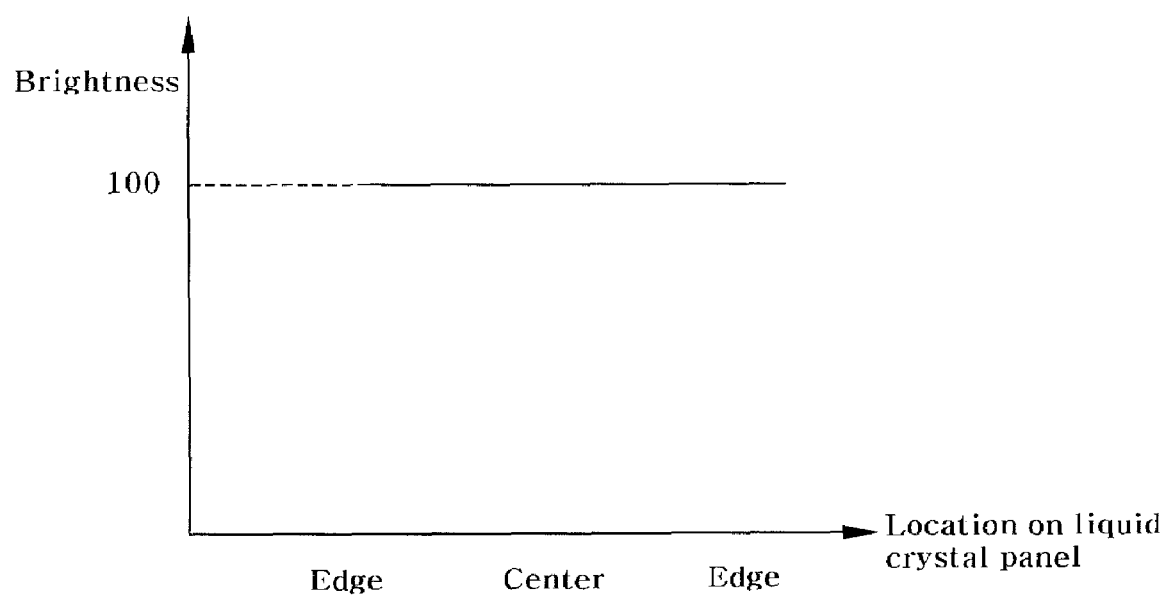
FIGS. 2 and 3 are a graph depicting brightness according to locations of a liquid crystal panel in a normal operation of the conventional LCD, and a front view of the liquid crystal panel.

Referring to FIG. 7, the diffuser sheet 24 according to the first embodiment is formed to have a lower light transmittance at predetermined regions A, B, C and D than at other regions. The predetermined regions A, B, C and D of the diffuser sheet 24 face regions of the polarizer 10 (see FIG. 1) where the hourglass phenomenon occurs, that is, upper, lower, right and left edges of the polarizer 10 deviated from the central region thereof. Arrows of FIG. 7 indicate the quantity of light transmitted through the diffuser sheet 24. As a result, by lowering the light transmittance of the predetermined regions A, B, C and D of the diffuser sheet 24, the quantity of light transmitted through the predetermined regions A, B, C and D is lowered below the quantity of light transmitted through the other regions of the diffuser sheet 24, particularly, the central region of the diffuser sheet 24.

On the other hand, as described above, when the polarizer 10 (see FIG. 1) is exposed to heat and humidity for a long time period, the upper, lower, right and left edges of the polarizer 10 become weakened and allow light to be transmitted therethrough exceeding a desired light transmittance condition, causing the hourglass phenomenon. Here, the predetermined regions A, B, C and D of the diffuser sheet 24 face the weakened regions of the polarizer.

According to the first embodiment of the invention, LCD has an advantageous effect of compensating the hourglass phenomenon with the diffuser plate 24. Specifically, even when the hourglass phenomenon occurs in the weakened regions of the polarizer, it is possible for LCD of the invention to suppress non-uniform brightness by reducing the quantity of light transmitted through the predetermined regions of the diffuser sheet 24 that correspond to the weakened regions of the polarizer, thereby reducing light quantity which can pass through the liquid crystal panel.

Figure 4:
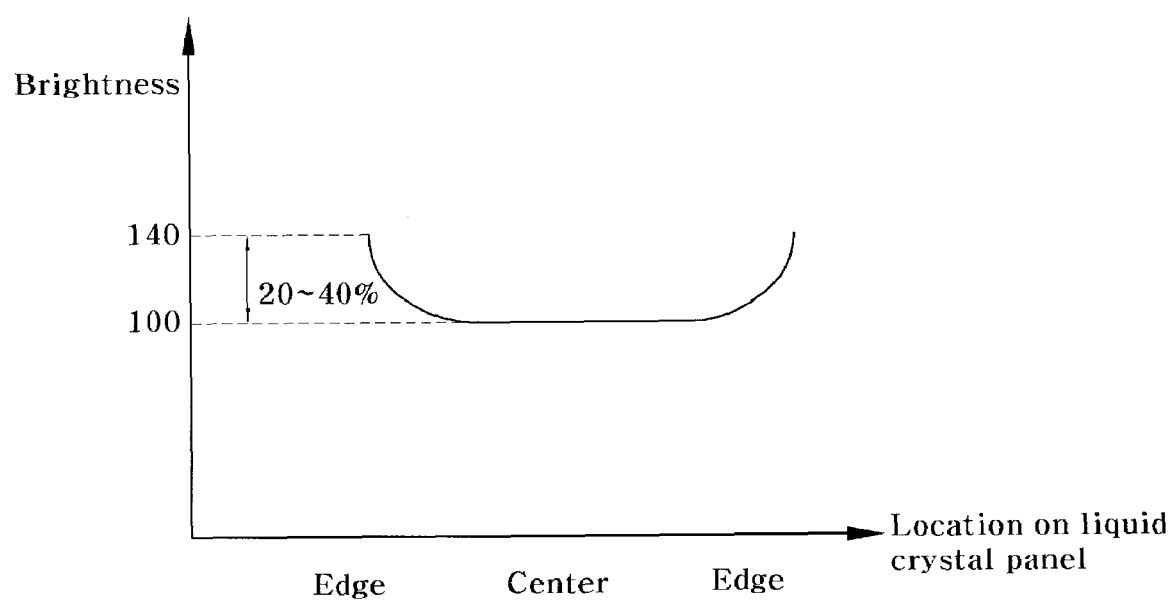
FIGS. 4 and 5 are a graph depicting brightness according to locations of the liquid crystal panel when an hourglass phenomenon occurs on the conventional LCD, and a front view of the liquid crystal panel.
Figure 5:
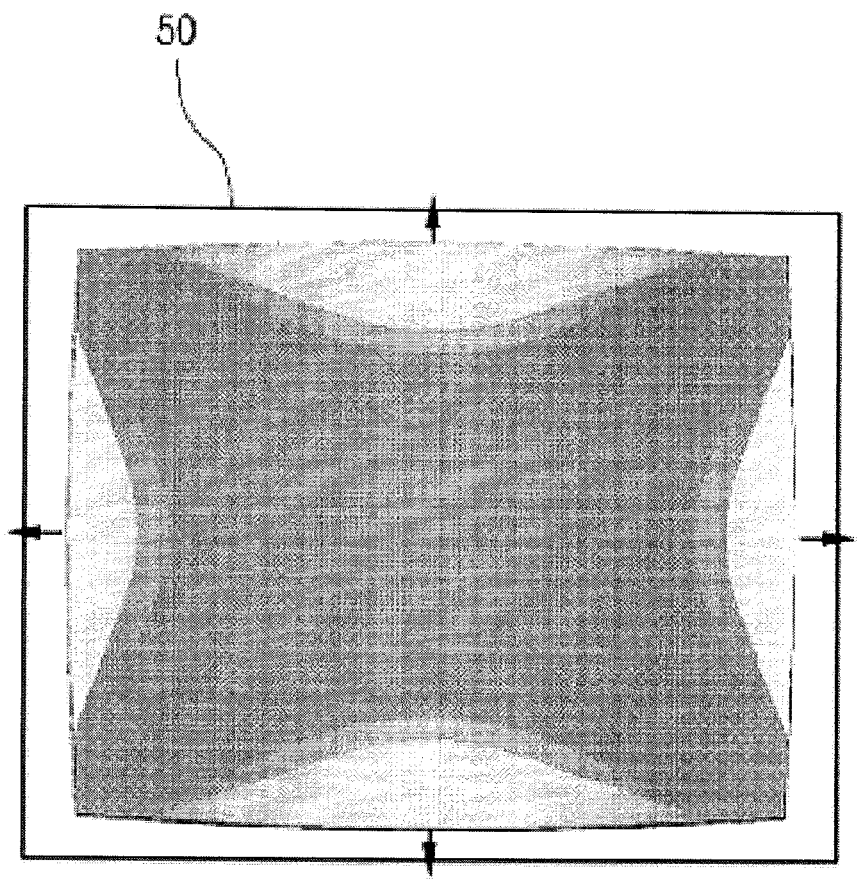

Preferably, the diffuser sheet 24 is designed such that the predetermined regions A, B, C and D of the diffuser sheet 24 have a lower light transmittance by about 10~20% compared with other regions (particularly, the central region of the diffuser sheet). As described above (see FIG. 4), in the conventional LCD, the liquid crystal panel 50 has a higher light transmittance at the weak region near the edge of the polarizer by about 20~40% compared with the center of the WV polarizer upon occurrence of the hourglass phenomenon. Thus, when designing the diffuser sheet 24 such that predetermined regions A, B, C and D have an approximately 10~20% lower light transmittance than that of the other regions, the liquid crystal panel of LCD according to this embodiment does not experience non-uniform brightness even in the event of the hourglass phenomenon. In this case, however, some regions of the liquid crystal panel have a lower light transmittance than the central region thereof in a normal operation, which also causes non-uniformity in brightness. Hereinafter, this will be described in detail.

Figure 8:
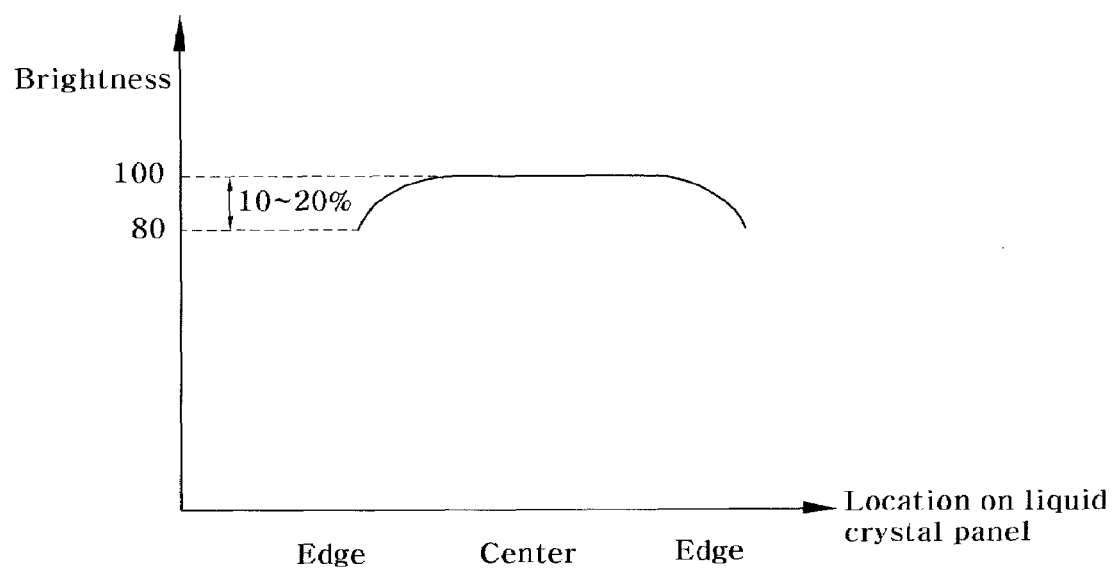
FIG. 8 is a graph depicting brightness according to locations of a liquid crystal panel in a normal operation of LCD according to the first embodiment.
Figure 9:
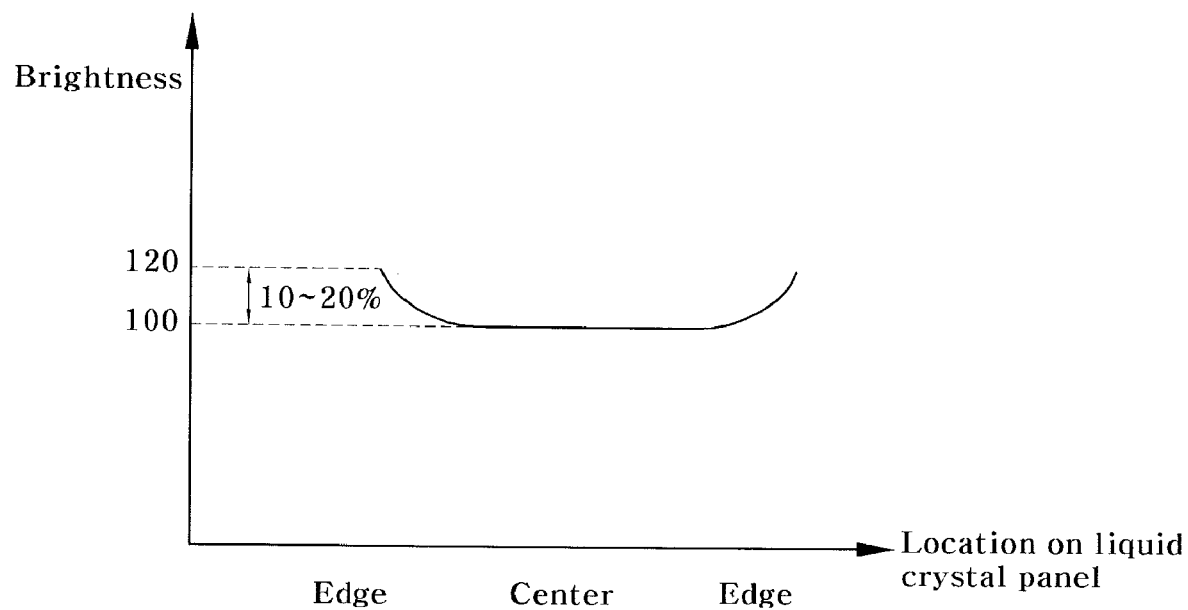
FIG. 9 is a graph depicting brightness according to locations of the liquid crystal panel when the hourglass phenomenon occurs on LCD according to the first embodiment.

FIGS. 8 and 9 are graphs depicting brightness according to locations of the liquid crystal panel of LCD according to the first embodiment, in which FIG. 8 is a graph in a normal operation and FIG. 9 is a graph in the case where the hourglass phenomenon occurs on the liquid crystal panel.

In FIG. 8, the liquid crystal panel 50 has a lower brightness near the edges than the central region in the normal operation, and specifically, has a brightness of about 80~100 at the edges, assuming that it has a brightness of 100 at the central region. In other words, the liquid crystal panel 50 of the invention has a lower brightness near the edges by about 10~20% than at the central region. In this manner, the light transmittance of the diffuser sheet 24 is lowered near the edges by 10~20% compared with the central region, so that such a lower light transmittance is applied to the liquid crystal panel in the normal operation to allow a reduced quantity of light to be transmitted through the polarizer and the liquid crystal panel.

In FIG. 9, the liquid crystal panel 50 has about a 10~20% higher light transmittance near the edges than the central region upon occurrence of the hourglass phenomenon. Thus, since the light transmittance of the diffuser sheet 24 is lowered by 10~20% near the edges compared with the central region, the quantity of light transmitted through the liquid crystal panel is increased by about 10~20% when the light transmittance of the diffuser plate 10 (see FIG. 1) is increased by 20~40% near the edges thereof due to the hourglass phenomenon.

As such, LCD of the invention has an advantageous effect in that brightness non-uniformity is suppressed as compared to the conventional LCD. In this regard, although the liquid crystal panel is slightly reduced in brightness near the edges compared with the central region in the normal operation, reduction in brightness of about 10~20% will not become a significant problem because a viewer cannot recognize such a small difference. However, if the liquid crystal panel has a higher brightness near the edges by 20~40% compared with the central region in the normal operation, the viewer will significantly recognize non-uniform brightness.

Reduction in light transmittance of the diffuser sheet 24 can be achieved by increasing the thickness of the corresponding regions or by adding a substance conducive to reduction of the light transmittance. Such methods are well known in the art, and detailed description thereof will be omitted herein.

Referring to FIG. 7 again, the predetermined regions A, B, C and D of the diffuser sheet 24 comprise first regions C, D present in the range of 75~100% in right and left directions (that is, opposite lateral directions) from a vertical center of the diffuser sheet 24 and second regions A, B present in the range of 50~100% in upper and lower directions (that is, opposite transverse directions) from a horizontal center thereon. Here, the predetermined regions of the diffuser preferably exclude overlapping regions between the first regions and the second regions. That is, if the reduction of the light transmittance is duplicated in each of the first regions C, D and the second regions A, B, the overlapping regions are excessively lowered in the light transmittance. To prevent such an excessively low light transmittance, the overlapping regions between the first regions C, D and the second regions A, B are formed to have the same light transmittance as that of non-overlapping first and second regions.

It should be understood that, although the reduction percentage of the light transmittance and the regions having the reduced light transmittance as described above are values obtained by the applicant of the present invention through repetitious tests, the present invention is not limited to these values. This is because these values can be varied depending on properties of the respective components of the liquid crystal display and test results.

Next, the second embodiment of the present invention will be described in detail with reference to the accompanying drawings.

Figure 10:
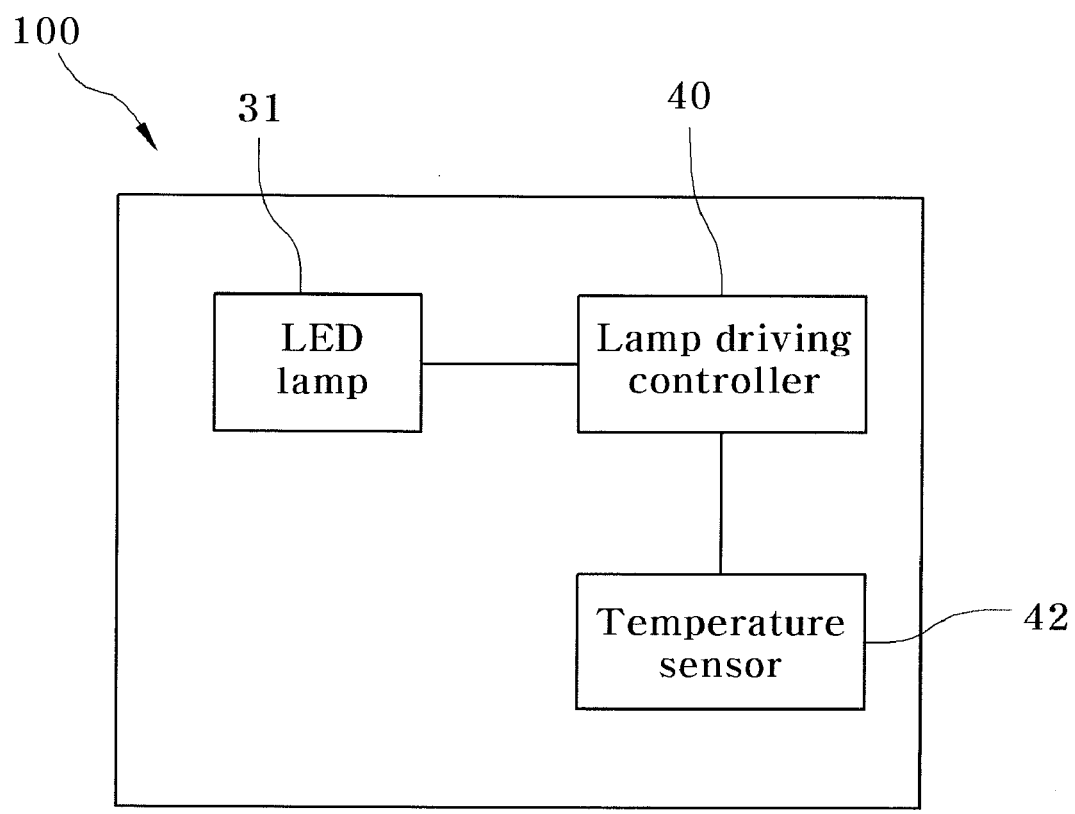
FIG. 10 is a block diagram illustrating major components of LCD according to a second embodiment of the present invention.

FIG. 10 is a block diagram illustrating major components of LCD according to the second embodiment of the present invention.

Referring to FIG. 10, the liquid crystal display 100 according to this embodiment comprises at least one temperature sensor 10 provided to a polarizer 10 (see FIG. 1), an LED lamp 31 included in the backlight unit 30, and a lamp driving controller 40.

The temperature sensor 42 is located on the surface of the polarizer 10 (see FIG. 1) to detect the hourglass phenomenon. Preferably, plural temperature sensors 42 are provided to weakened upper, lower, right and left portions of the polarizer, that is, to the surface of the region of the polarizer 10 where the hourglass phenomenon occurs. As described above, since the polarizer is vulnerable to heat and humidity, the upper, lower, right and left edges of the polarizer 10 are weakened and allow light to be transmitted exceeding a desired light transmittance condition when exposed to heat and humidity for a long time period. As a result, each weakened portion of the polarizer where the hourglass phenomenon occurs has a higher temperature than other portions, which can be detected by the temperature sensor 42. It is desirable that the temperature sensor 42 be adhered to the surface of the polarizer 10 so as not be affected by surrounding environment.

The temperature sensor 42 sends a signal in the event of detecting the hourglass phenomenon, that is, when detecting a higher temperature than a normal temperature. The temperature sensor 42 can generate the signal in various manners in response to detection of the hourglass phenomenon. For example, based on a preset reference temperature at which the temperature sensor 42 does not detect the hourglass phenomenon, the temperature sensor 42 generates a signal when detecting a higher temperature than the reference temperature due to the hourglass phenomenon. Alternatively, with a separate comparator, the temperature sensor 42 can generate a signal by comparing the reference temperature with a temperature when the hourglass phenomenon occurs. These methods are well known to those skilled in the art, and thus detailed description thereof will be omitted herein. In addition, it should be understood that the present invention is not limited to a specific example.

The lamp driving controller 40 controls operation of the LED lamp 31 of the backlight unit 30, and is connected to the temperature sensor 42 to make signal exchange therewith. The lamp driving controller 40 controls the LED lamp 31 based on a normal mode in which the hourglass phenomenon does not occur and a compensation mode in which the hourglass phenomenon occurs. In the compensation mode, the lamp driving controller 40 drives the LED lamp 31 in such a fashion as to adjust the brightness of the predetermined region of the LED lamps 31 to be reduced, preferably by approximately 15~30%, below the brightness in the normal mode in response to an hourglass phenomenon detection signal sent from the temperature sensor 42. This value was obtained through tests of the applicant and based on the test result that, upon occurrence of the hourglass phenomenon, the polarizer 10 allows an approximately 15~30% greater quantity of light to be transmitted therethrough than in the normal mode. On the other hand, in the compensation mode, the lamp driving controller 40 makes other regions of the LED lamp 31, that is, where the hourglass phenomenon does not occur, exhibit the same brightness as that in the normal mode. Hereinafter, the configuration for the abovementioned operation will be described in detail.

Figure 11:
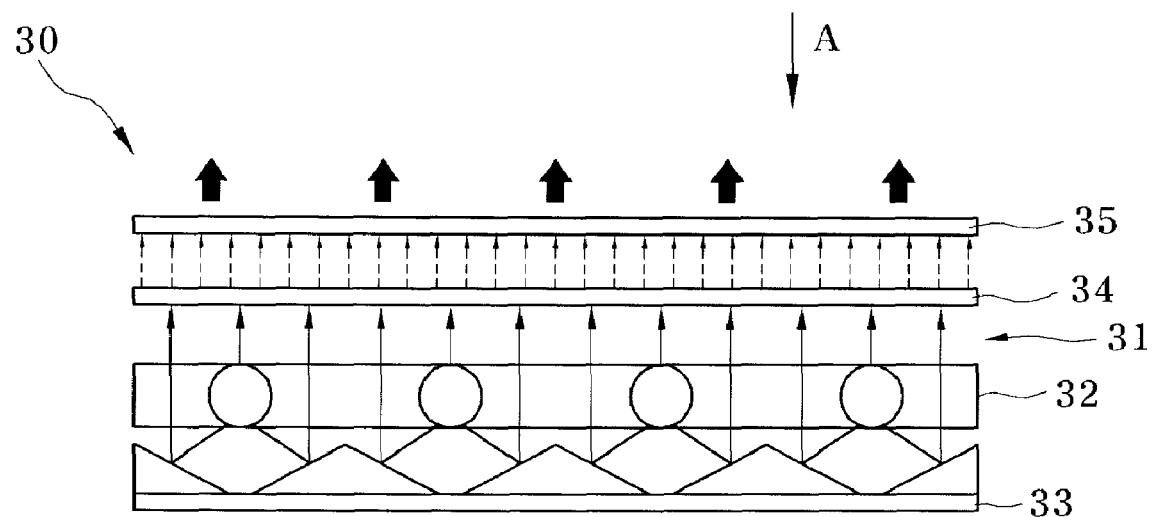
FIG. 11 is a constructional view of an LED backlight unit applied to LCD according to the second embodiment.

FIG. 11 is a constructional view of an LED backlight unit applied to LCD according to the second embodiment of the present invention.

Referring to FIG. 11, the backlight unit 30 applied to LCD according to the second embodiment of the invention comprises an LED lamp 31 including plural LEDs, a light guide plate 32, a reflector sheet 33, a diffuser sheet 34, and a prism sheet 35.

The light guide plate 32 is a component to convert incident light from the LED lamp 31 into a uniform sheet beam, and is formed of polymethylmethacrylate which is an acrylic resin. Since polymethylmethacrylate has the lowest light absorption in the region of visible light among polymeric materials, it exhibits good transparency and gloss.

The reflector sheet 33 is located below the light guide plate 32 and serves to enhance efficiency in use of light by reflecting incident light from the LED lamp 31 to a light emitting plane of the backlight unit 30, that is, towards the liquid crystal panel. Further, the reflector sheet 33 makes the entire light emitting plane of the backlight unit 20 uniform in brightness distribution by adjusting a reflected amount of the overall incident light to adjust an overall reflecting amount of the backlight unit 20.

The diffuser sheet 34 is located near the liquid crystal panel 50 above the light guide plate 32, and serves to increase and uniformize the brightness in a forward direction of the light emitting plane of the backlight unit 30 by diffusing and scattering light entering the diffuser sheet 34 through the light guide plate 32.

The prism sheet 35 enhances directionality of light and narrows a viewing angle by blocking light emitted from the diffuser sheet 34 from traveling in other directions instead of the forward direction of the light emitting plane, thereby improving the brightness in the forward direction of the light emitting plane of the backlight unit 30.

Figure 12:
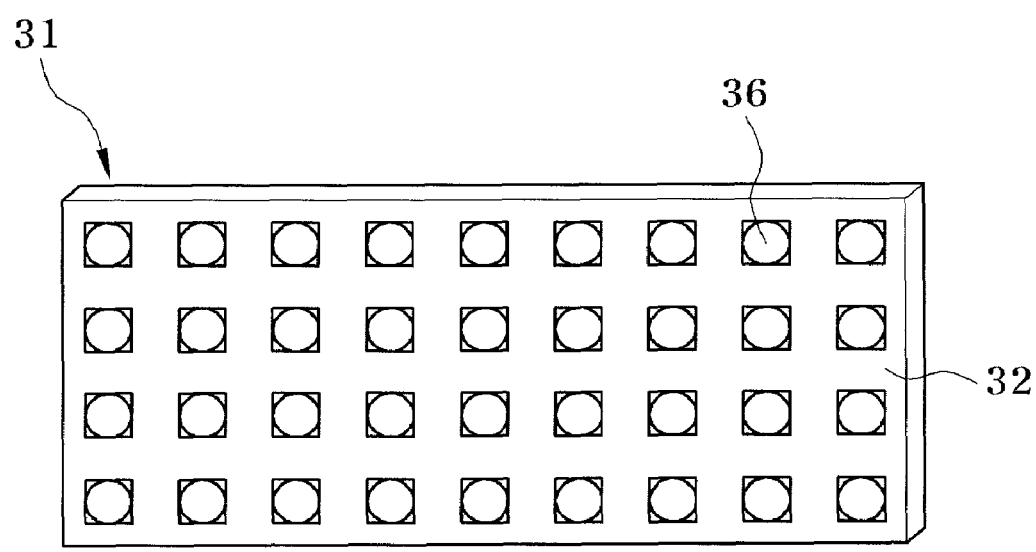
FIG. 12 is a front view of a light guide plate and an LED lamp viewed in a direction of arrow A of FIG. 11 in a normal mode of LCD according to the second embodiment.
Figure 13:
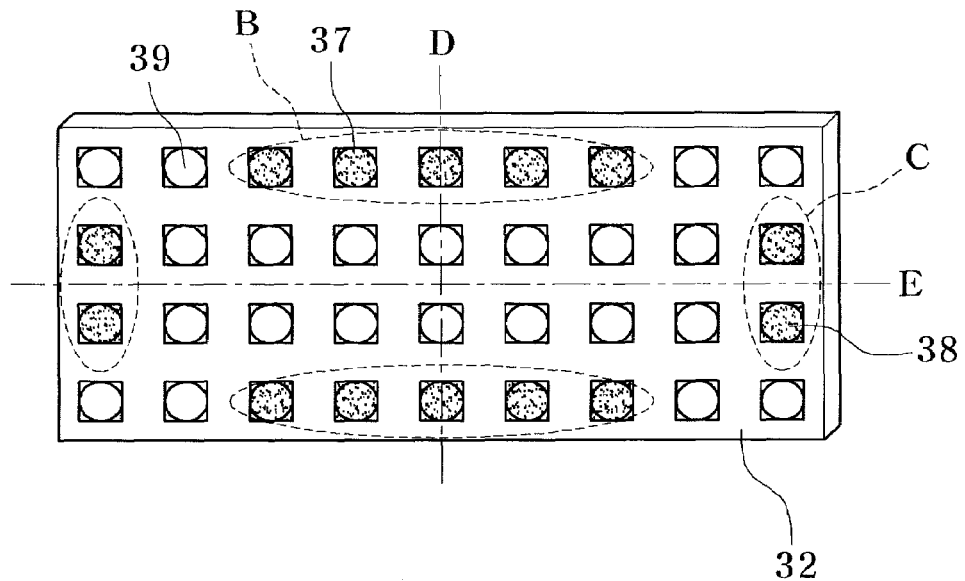
FIG. 13 is a front view of the light guide plate and the LED lamp viewed in a direction of arrow A of FIG. 11 in a compensation mode of LCD according to the second embodiment.

FIGS. 12 and 13 are front views of the light guide plate 32 and LED lamp 31 viewed in a direction of arrow A of FIG. 11 in a normal mode and a compensation mode, respectively, for illustrating operation of LCD according to the second embodiment of the present invention.

Referring to FIG. 12, the lamp driving controller 40 controls the LED lamp 31 such that respective LEDs 36 of the LED lamp 31 can emit light with the same brightness in the normal mode.

Referring to FIG. 13, the lamp driving controller 40 controls the LED lamps 31 in response to a signal from the temperature sensor 42 in the compensation mode such that the brightness of LEDs 27 and 38 corresponding to a pair of predetermined regions B, C of the LED lamp 31 is lower than that of these LEDs in the case where the hourglass phenomenon is not detected, that is, in the normal mode. The predetermined regions B, C of the LED lamp 31 preferably face the regions of the polarizer 10 (see FIG. 1) where the hourglass phenomenon occurs.

LEDs 39 in other regions of the LED lamp 31 excluding the predetermined regions B, C are designed to have the same brightness regardless of the hourglass phenomenon. Therefore, the predetermined regions B, C the LED lamp 31 have a lower brightness than the other regions thereof in the compensation mode. On the other hand, the regions of the polarizer 10 corresponding to the predetermined regions B, C, that is, the regions of the polarizer 10 where the hourglass phenomenon occurs, allow a greater quantity of light to be transmitted therethrough in the compensation mode than in the normal mode. As a result, after being emitted from the LED lamp 31 of the backlight unit 31, light passing through the polarizer 10 and the liquid crystal panel 50 has a similar transmitted amount on the overall surface of LCD. Therefore, LCD does not exhibit non-uniform brightness.

As a matter of course, although most of liquid crystal panels exhibit similar inclination of the hourglass phenomenon, they may experience different ranges of the hourglass phenomenon from one another. Thus, for more precise compensation of the hourglass phenomenon, it is necessary to set the brightness of the regions of the LED lamp corresponding to the regions of each liquid glass panel where the hourglass phenomenon occurs to be lowered in the compensation mode after checking such regions of the liquid glass panel. However, it is difficult in terms of costs or efficiency to set the brightness of the regions of the LED lamp after checking the regions of the respective liquid crystal panels. Furthermore, the diffuser sheet in front of the LED lamp causes a borderline of brightness to be unclearly exhibited on the backlight unit in the compensation mode. Therefore, even by setting the predetermined regions B, C of the LED lamp based on statistics with regard to the regions of the respective liquid crystal panels that often exhibit the hourglass phenomenon, it is possible to compensate the hourglass phenomenon for all the panels.

Thus, the applicant could obtain common regions of the liquid crystal panels experiencing the hourglass phenomenon through repetitious tests on various kinds of liquid crystal panels as follows. That is, the predetermined regions B, C of the LED lamp 31 comprise a first LED region C present in the range of 75~100% in either lateral direction from a vertical central line D on the LED lamp and a second LED region B present in the range of 50~100% in either transverse direction from a horizontal central line E thereon. Here, the predetermined regions B, C of the LED lamp 31 preferably exclude an overlapping region between the first LED region C and the second LED region B.

Figure 14:
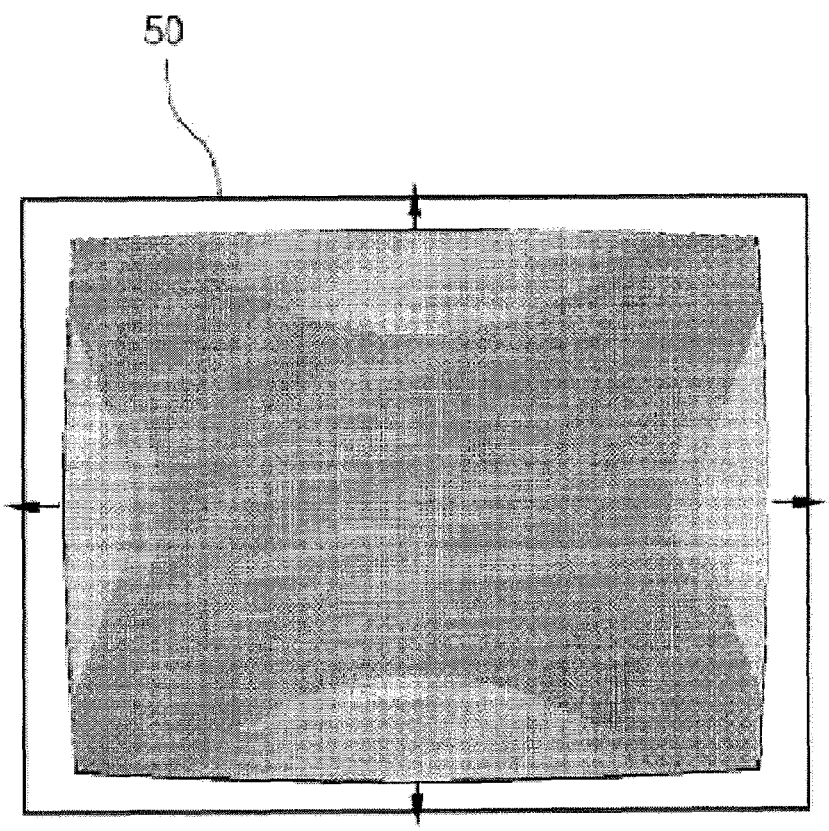
FIG. 14 is a front view of a liquid crystal panel of LCD according to the second embodiment in the compensation mode.

FIG. 14 is a front view of a liquid crystal panel 50 of LCD according to the second embodiment of the present invention in the compensation mode. As shown in FIG. 14, in LCD according to this embodiment, since light emitted from the LED lamp 31 of the backlight unit 30 and passing through the polarizer 10 and liquid crystal panel 50 exhibits a similar brightness on the overall surface of LCD, the hourglass phenomenon cannot be detected on LCD of this embodiment.

As apparent from the above description, in the liquid crystal display according to the present invention constructed as described above, even when an hourglass phenomenon occurs due to the inherent structure of a polarizer, the hourglass phenomenon is avoided from being observed by a viewer by controlling the quantity of light or the light transmittance of predetermined regions of a diffuser plate inside a backlight unit to be lower than other regions or by controlling the brightness of predetermined regions of an LED lamp to be lower than other regions, thereby preventing non-uniform brightness while improving image quality.

Although the present invention has been described with reference to the embodiments shown in the drawings, these embodiments are provided for illustrative purpose, and it will be apparent to those skilled in the art that various modifications and equivalent embodiments can be made without departing from the scope and spirit of the present invention. Therefore, the scope of the present invention is limited only by the claims set forth herein as follows.

What is claimed is:

1. A liquid crystal display, comprising a liquid crystal panel, a polarizer adhered to the liquid crystal panel, and a backlight unit including a diffuser sheet,
   wherein a predetermined region of the diffuser sheet facing a region of the polarizer, where an hourglass phenomenon occurs, is formed to permit a smaller quantity of light to be transmitted therethrough than other regions of the diffuser sheet,
   wherein the predetermined region of the diffuser sheet comprises a first region present in the range of 75~100% in either lateral direction from a vertical center on the diffuser sheet and a second region present in the range of 50~100% in either transverse direction from a horizontal center thereon, and excludes an overlapping region between the first region and the second region.

2. A liquid crystal display, comprising a liquid crystal panel, a polarizer adhered to the liquid crystal panel, and a backlight unit including a diffuser sheet,
   wherein a predetermined region of the diffuser sheet facing a region of the polarizer, where an hourglass phenomenon occurs, is formed to have a lower light transmittance than other regions of the diffuser sheet,
   wherein the predetermined region of the diffuser sheet comprises a first region present in the range of 75~100% in either lateral direction from a vertical center on the diffuser sheet and a second region present in the range of 50~100% in either transverse direction from a horizontal center thereon, and excludes an overlapping region between the first region and the second region.

3. In a liquid crystal display, comprising a liquid crystal panel, a polarizer adhered to the liquid crystal panel, and a backlight unit located at rear of the liquid crystal panel to which the polarizer is adhered, the backlight unit employing an LED lamp comprised of a plurality of LEDs, the improvement comprising:
   a temperature sensor disposed on a surface of the polarizer to detect an hourglass phenomenon; and
   a lamp driving controller connected to the temperature sensor to make signal exchange with the temperature sensor and to control brightness of a predetermined region of the LED lamp in response to an hourglass phenomenon detection signal from the temperature sensor.

4. The liquid crystal display according to claim 3, wherein the lamp driving controller controls the brightness of the predetermined region of the LED lamp to be reduced by about 15~20% when receiving the hourglass phenomenon detection signal than when not receiving the hourglass phenomenon detection signal.

5. The liquid crystal display according to claim 3, wherein the temperature sensor is disposed on the surface of a region of the polarizer where the hourglass phenomenon occurs.

6. The liquid crystal display according to claim 3, wherein the predetermined region of the LED lamp having the brightness controlled by the lamp driving controller faces the region of the polarizer where the hourglass phenomenon occurs.

7. The liquid crystal display according to claim 3, wherein the predetermined region of the LED lamp having the brightness controlled by the lamp driving controller comprises a first LED region present in the range of 75~100% in either lateral direction from a vertical central line on the LED lamp and a second LED region present in the range of 50~100% in either transverse direction from a horizontal central line thereon, and excludes an overlapping region between the first LED region and the second LED region.

* * * * *